Figures 1, 2:
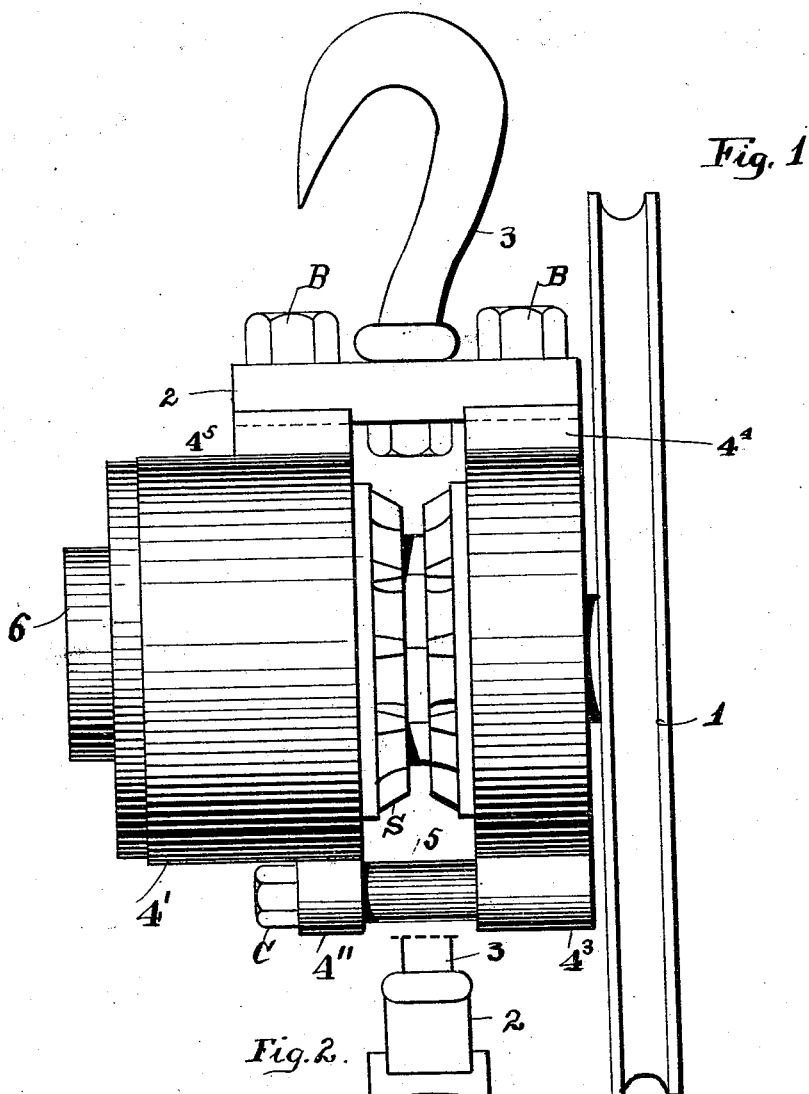

(No Model.) 3 Sheets—Sheet 1.

E. D. GLEASON.
DIFFERENTIAL PULLEY.

No. 514,888. Patented Feb. 13, 1894.

Witnesses.

Inventor.
Edward D. Gleason
by his attorney
Homer A. Hert (No Model.)　　　　　　　E. D. GLEASON.　　　　3 Sheets—Sheet 2.
DIFFERENTIAL PULLEY.
No. 514,888.　　　　　　　　　　　Patented Feb. 13, 1894.
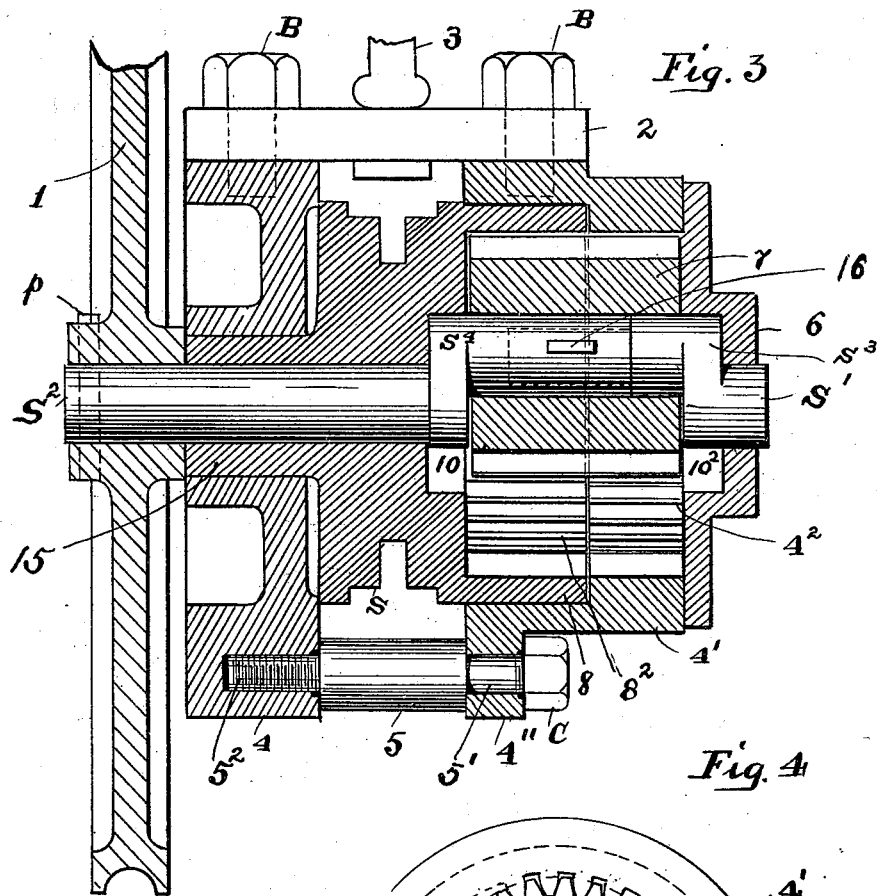
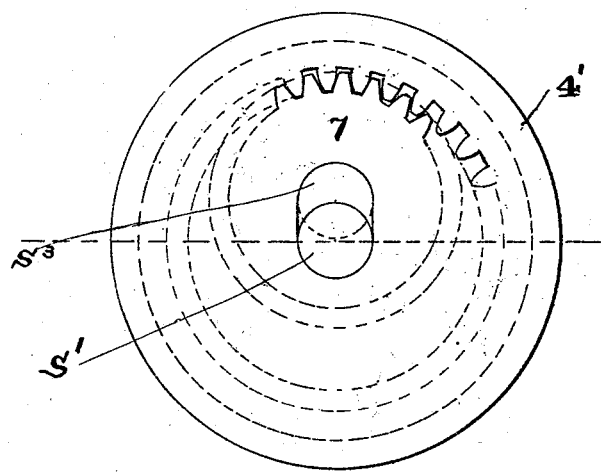
Witnesses　　　　　　　　　　　　Inventor.
　　　　　　　　　　　　　　　Edward D. Gleason
　　　　　　　　　　　　　　　by his attorney
　　　　　　　　　　　　　　　Homer A. Herr.

(No Model.) 3 Sheets—Sheet 3.
E. D. GLEASON.
DIFFERENTIAL PULLEY.
No. 514,888. Patented Feb. 13, 1894.
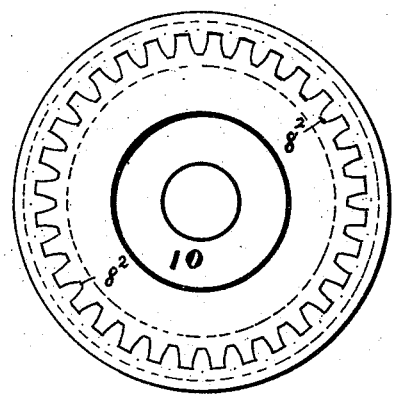
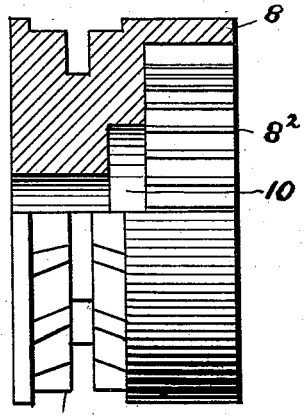
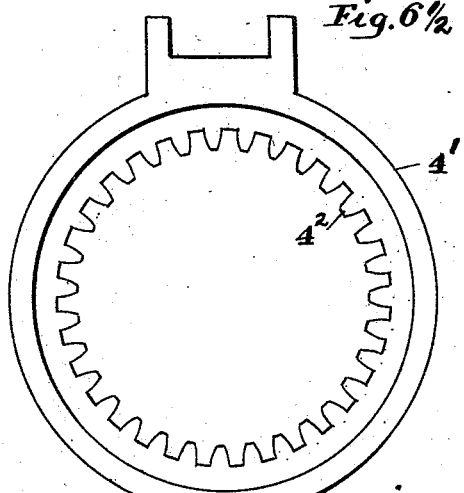
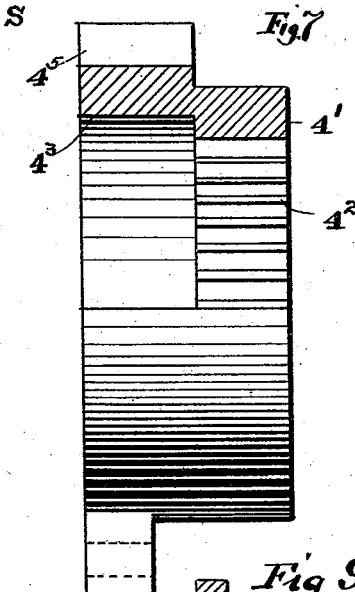
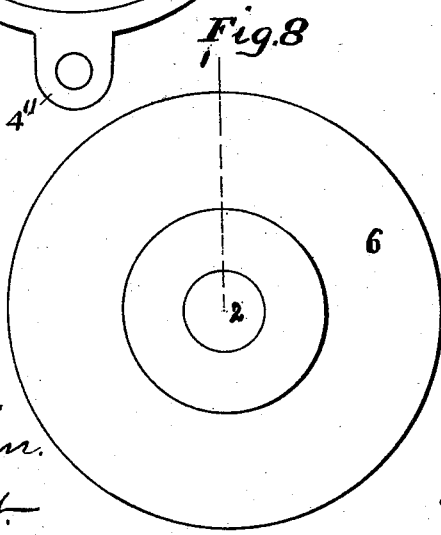
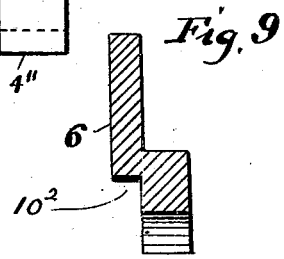
Witnesses.
Inventor.
Edward D. Gleason
by his attorney

UNITED STATES PATENT OFFICE.

EDWARD D. GLEASON, OF PHILADELPHIA, PENNSYLVANIA.

DIFFERENTIAL PULLEY.

SPECIFICATION forming part of Letters Patent No. 514,888, dated February 13, 1894.

Application filed May 4, 1893. Serial No. 472,972. (No model.)

*To all whom it may concern:*

Be it known that I, EDWARD D. GLEASON, a citizen of the United States of America, residing at Philadelphia, in the county of Philadelphia and State of Pennsylvania, have invented certain new and useful Improvements in Portable Hoists, of which the following is a specification, reference being had therein to the accompanying drawings.

My invention has reference to hoists and consists of certain features fully set forth in the following specification and the accompanying drawings forming part thereof.

My invention relates more particularly to a portable hoist.

The object of my invention is to have a cheap portable mechanism that will develop the maximum of power at a minimum of weight and cost, and while the cost is low the practical efficiency is in no wise impaired.

It consists, broadly, of a chain or sprocket wheel for supporting the load and held in bearings at either side thereof. One of these bearings is of greatly enlarged diameter and carries an internal spur gear. To the box which carries or supports the bearing is fixed integrally an internal gear having one less tooth than is carried by the sprocket wheel or the internal gear forming an integral part thereof. An interposing and interlocking pinion operates this sprocket wheel in the manner to be described in such a way that on every revolution of the said pinion around the teeth of the fixed spur gear the sprocket wheel will have a rotary motion equal to the pitch of one tooth of the aforesaid sprocket gear. My power is thus in proportion to the number of teeth in the said internal gear.

In the drawings like parts are referred to by a letter or figure of a similar character.

Figure 1 is a side elevation of my machine; Fig. 2 an end view thereof, wheel 1 omitted; Fig. 3 a longitudinal section thereof. Fig. 4 is a plan of the gearing, showing the pinion on its crank. Fig. 5 is an end view of the sprocket wheel, showing the internal spur gear thereof; Fig. 6 part side elevation and part longitudinal section thereof. Fig. 6½ is an end view of the bearing for one side of the sprocket wheel, showing the internal spur gear thereof. Fig. 7 is part side elevation and part longitudinal section of Fig. 6½. Fig. 8 is a plan of the cap. Fig. 9 is a section on line 1—2 Fig. 8.

4 is a bearing for the shaft $S^2$, and indirectly for the sprocket wheel S. On its upper side it is provided with a lug $4^4$ and on its lower side with a lug $4^3$. $4'$ is also a bearing. This bearing is provided on its lower side with a lug $4''$ and on its upper side with a lug $4^5$, Fig. 1. The arm 2 connects the bearings aforesaid at their upper sides, being so held by the bolts B, B. To this arm is secured the supporting hook 3. These bolts must be made of a strength sufficient to bear the entire weight the machine is designed to lift or hold.

5 is a brace for holding these bearings in proper relation at their lower sides. The end $5^2$ thereof is screwed into the bearing 4 and the bolt end $5'$ passes through the hole in the projection $4''$. The nut C is then applied, holding them firmly together. The bearing $4'$, on its inner side or face is turned true and smooth. This inner face $4^3$, Fig. 7, being exactly concentric with a center line through the shaft $S^2$. The other end of the said bearing also constitutes an internal spur gear. The pitch line or pitch circumference of the teeth constituting this internal gear is also concentric with the center of the shaft $S^2$.

S is a chain or sprocket wheel, which supports directly the weight to be lifted. The specific construction of the chain holding portion of this wheel is not material to my invention. This wheel is provided on its one side integrally with a projecting internal spur gear, without arm and having a smooth external circumference or face. This face is in contact or bearing on the internal face of the bearing $4'$. The external face, therefore, of the aforesaid integrally spur gear of the sprocket, is of the same diameter as the internal face of the bearing $4'$, shown clearly in Fig. 3. When in operation the said external face of the collar 8 and bearing therefor $4'$ bear the relation to each other respectively of shaft and journal box. The aforementioned braces 2 and 5 holding them in their correct positions.

The pitch diameter of the teeth constituting the internal spur gear 8 is the same as the pitch diameter of the teeth constituting the internal spur on the bearing 4' hereinbefore referred to; but while the pitch diameter of these two internal gears is the same the pitch of their respective teeth differs.

In the drawings the internal gear of the bearing 4' has thirty-one teeth and the internal gear of the spur 8 has thirty-two teeth, or one more than that carried by the aforesaid bearing. (It could however be made to carry one less and be just as effectual in its work.) The aforementioned sprocket wheel S, at the side opposite to the said internal spur gear 8, has a projecting sleeve bearing 15 also integral with its body. The bore of the bearing 4 is of a proper size to support the sleeve as shown in Fig. 3, and thus the sprocket wheel S.

$S^2$ is a shaft. Secured to this shaft at its projecting end is a rope operating wheel 1, the said wheel being held to the said shaft by the pin $p$, Fig. 3. This shaft, at its inner end, has rigidly fixed to it a crank arm $S^4$, Fig. 3.

S' is the pivotal stud and $S^3$ the projecting arm of another crank arm. The center of the stud S' and shaft $S^2$ are on a common line, and the crank arms $S^3$ and $S^4$ are of a uniform length. The arm $S^4$ of the crank is cylindrical and true and it has a hole drilled in its exact center, and the arm of the crank $S^3$ has a stud turned on its body of a diameter equal to the diameter of the hole in the arm $S^4$. The aforesaid stud is fitted into the hole mentioned and there held by the key 16. A slot being provided in the pinion 7 to admit this key. It is now evident that the shaft $S^2$, the crank arm $S^4$, the crank arm $S^3$ and the stud S' all practically constitute one piece, which becomes the crank supporting arm for the pinion 7. The sprocket S has its bore annularly enlarged as shown at 10, Fig. 3, thus making a bearing support for the arm $S^4$. The plate 6, which supports the aforementioned stud S', as well as incasing the mechanism, has a similar internal annular enlargement of its bore as shown at $10^2$, Fig. 3. The wheel 1 being held by the pin $p$ to the shaft $S^2$ it is evident that when the wheel 1 is rotated the said shaft will also be rotated. This wheel 1 is the operating wheel of the machine. Now as the pinion 7 is journaled on said shaft as shown in Figs. 3 and 4 it is evident it will be carried around on the aforementioned crank as the wheel 1 is rotated.

As previously described the internal spur gear 4' has one tooth less than the internal spur 8. Now the pinion 7 is of a length equal to the length or depth of the teeth of the two aforesaid internal gears combined, and as the two said gears are of like pitch diameter and the teeth of the pinion mesh in the teeth of both internal gears, it follows that on each revolution of the shaft $S^2$, the pinion 7 has made one revolution on the pitch circumference of the aforementioned gears, and has therefore moved the sprocket wheel a rotary distance equal to the pitch of one of the teeth thereof.

I do not confine myself to the mere specific details of construction as I could make various modifications without departing from the spirit of my invention.

Having now described my invention, what I claim as new, and desire to secure by Letters Patent, is—

1. In a portable hoist the combination of a weight supporting chain or sprocket wheel provided with an internal spur gear wheel, a crank supporting shaft, a pinion held on said shaft consisting of a sleeve crank $S^4$ and stud crank $S^3$ meshing in said internal spur gear wheel, a supporting case for said sprocket wheel an internal spur gear carried by said case; the pitch circumference of the aforesaid two spur gears being equal but the latter having one less gear tooth than the former, and whereby when the pinion is rotated around the fixed spur held by the supporting case for the aforesaid sprocket spur, the said sprocket spur and the sprocket will be rotated an angular distance equal to the pitch of one of the teeth of the said sprocket wheel, and the load will be likewise moved an equivalent distance.

2. The combination in a portable hoist of a chain or sprocket wheel provided with an enlarged hole 10 at the inner side thereof, an internal spur gear wheel carried by said sprocket wheel, a supporting case for the sprocket wheel also provided with an internal spur gear, a sleeve crank $S^4$, a stud crank $S^3$, a pinion supported by said cranks and a supporting plate 6 also provided with an enlarged internal hole or bore $10^2$, substantially as described for the purpose set forth.

3. The combination in a portable hoist of an operating rope wheel, a weight supporting chain or sprocket wheel, a common supporting shaft for said wheels provided with a crank at one end said crank consisting of a sleeve crank $S^4$ and a stud crank $S^3$ thereof and at the other end to which is secured the aforesaid rope wheel, a pinion carried by said crank, supporting bearings for said shaft, an internal spur gear fixed to said sprocket wheel and an internal spur gear fixed to the crank supporting end of said shaft, the two spur gears aforesaid having a like pitch circumference but having a difference of one tooth, whereby on each revolution of the operating or rope wheel the weight supporting chain or sprocket wheel will be rotated a distance equal to the pitch of one of the teeth of the internal spur fixed thereto.

In testimony whereof I affix my signature in presence of two witnesses.

EDWARD D. GLEASON.

Witnesses:
JOSHUA R. MORGAN,
CHARLES ENGLE.